(12) United States Patent
Hanlon et al.

(10) Patent No.: US 11,597,535 B1
(45) Date of Patent: Mar. 7, 2023

(54) UNMANNED AERIAL VEHICLE MAINTENANCE TROUBLESHOOTING DECISION TREE

(71) Applicant: Amazon Technologies, Inc., Seattle, WA (US)

(72) Inventors: Jon T. Hanlon, Mercer Island, WA (US); Mark Daniel Sibon, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 260 days.

(21) Appl. No.: 16/456,484

(22) Filed: Jun. 28, 2019

Related U.S. Application Data

(63) Continuation of application No. 15/190,022, filed on Jun. 22, 2016, now Pat. No. 10,399,706.

(51) Int. Cl.
*G07C 5/08* (2006.01)
*G06N 5/02* (2006.01)
*B64F 5/60* (2017.01)
*G07C 5/00* (2006.01)
*G06F 8/65* (2018.01)

(52) U.S. Cl.
CPC .............. *B64F 5/60* (2017.01); *G06F 8/65* (2013.01); *G06N 5/02* (2013.01); *G07C 5/006* (2013.01); *G07C 5/008* (2013.01); *G07C 5/0808* (2013.01); *G07C 5/0816* (2013.01)

(58) Field of Classification Search
CPC .... G07C 5/008; G07C 5/0816; G07C 5/0808; G07C 5/006; B64F 5/60; G06F 8/65; G06N 5/02
See application file for complete search history.

(56) References Cited

U.S. PATENT DOCUMENTS 6,677,854 B2 *  1/2004  Dix ................. G07C 5/008
                                         340/426.24
8,560,161 B1 * 10/2013  Kator .............. G07C 5/008
                                         701/29.6
(Continued)

OTHER PUBLICATIONS

Kladis et al., "Diagram Matrix Reliability Analysis for Fault Assessment for a UAV Platform Application.", IEEE, Vehicle Power and Propulsion Conference, Harbin, China, Sep. 3-5, 2008, 6 pages.

(Continued)

*Primary Examiner* — Jeffrey C Boomer
(74) *Attorney, Agent, or Firm* — Lee & Hayes, P.C.

(57) ABSTRACT

A maintenance notification for a UAV may be sent to a service provider. The service provider may identify the UAV, such as to access a profile associated with the UAV that includes at least hardware and software configurations for the UAV. The service provider may generate a customized maintenance decision tree to organize tasks to be performed for the specific UAV to determine a maintenance action to remedy a fault or problem associated with the maintenance notification. The decision tree may be formed using history of the UAV and information about other UAVs to construct the decision tree tailored to the specific UAV under analysis. At least some operations included in the decision tree may be automated. Traversal of the decision tree may lead to updates of the UAV of hardware, software, or both.

19 Claims, 8 Drawing Sheets

(56) References Cited

U.S. PATENT DOCUMENTS

| | | | | |
|---|---|---|---|---|
| 8,886,389 | B2* | 11/2014 | Edwards | G01C 21/3407 |
| | | | | 701/29.1 |
| 9,317,840 | B2* | 4/2016 | Kleinschmidt | G06Q 10/20 |
| 9,355,549 | B2 | 5/2016 | McClintic et al. | |
| 9,471,903 | B1* | 10/2016 | Adderly | G06Q 10/1095 |
| 9,672,497 | B1* | 6/2017 | Lewis | G06Q 10/20 |
| 9,678,507 | B1* | 6/2017 | Douglas | G08G 5/0069 |
| 9,818,088 | B2 | 11/2017 | Penilla et al. | |
| 10,867,285 | B2* | 12/2020 | Kelley | G07C 5/0808 |
| 11,049,079 | B2* | 6/2021 | Derouen | G07C 5/0808 |
| 11,079,771 | B2* | 8/2021 | Battles | G08G 1/096725 |
| 2002/0156558 | A1 | 10/2002 | Hanson et al. | |
| 2005/0085964 | A1* | 4/2005 | Knapp | G05B 23/0283 |
| | | | | 701/31.4 |
| 2006/0293813 | A1* | 12/2006 | Nou | G07C 5/008 |
| | | | | 701/31.4 |
| 2007/0093215 | A1* | 4/2007 | Mervine | G07F 17/0057 |
| | | | | 455/99 |
| 2007/0100519 | A1* | 5/2007 | Engel | G07C 5/008 |
| | | | | 701/31.4 |
| 2009/0062978 | A1* | 3/2009 | Picard | G07C 5/008 |
| | | | | 701/31.4 |
| 2009/0106036 | A1* | 4/2009 | Tamura | G06Q 10/20 |
| | | | | 705/305 |
| 2009/0276115 | A1* | 11/2009 | Chen | G07C 5/008 |
| | | | | 701/29.6 |
| 2009/0300595 | A1 | 12/2009 | Moran et al. | |
| 2012/0116630 | A1* | 5/2012 | Howell | G06Q 10/0639 |
| | | | | 701/29.4 |
| 2012/0143449 | A1* | 6/2012 | Chauncey | G01F 9/023 |
| | | | | 701/51 |
| 2013/0151065 | A1* | 6/2013 | Ricci | G06F 8/61 |
| | | | | 701/31.4 |
| 2013/0317694 | A1 | 11/2013 | Merg et al. | |
| 2014/0018976 | A1* | 1/2014 | Goossen | G05D 1/0022 |
| | | | | 701/2 |
| 2014/0032034 | A1* | 1/2014 | Raptopoulos | G05D 1/0088 |
| | | | | 701/25 |
| 2014/0035527 | A1* | 2/2014 | Hayashigawa | B60L 3/04 |
| | | | | 320/109 |
| 2014/0163812 | A1* | 6/2014 | Randerath | B64F 5/60 |
| | | | | 701/32.9 |
| 2014/0188331 | A1* | 7/2014 | Amirpour | G07C 5/008 |
| | | | | 701/31.4 |
| 2014/0208306 | A1* | 7/2014 | Halder | G06F 8/65 |
| | | | | 717/172 |
| 2014/0236416 | A1* | 8/2014 | Amirpour | G01M 17/007 |
| | | | | 701/29.6 |
| 2015/0161827 | A1* | 6/2015 | Getchius | G08G 1/20 |
| | | | | 701/519 |
| 2016/0078695 | A1* | 3/2016 | McClintic | G07C 5/0816 |
| | | | | 701/29.4 |
| 2016/0096633 | A1* | 4/2016 | Guibert | G05B 23/0278 |
| | | | | 701/31.8 |
| 2016/0130013 | A1* | 5/2016 | Rangan | G08G 5/0013 |
| | | | | 340/963 |
| 2016/0144734 | A1* | 5/2016 | Wang | B60L 53/126 |
| | | | | 701/17 |
| 2016/0189440 | A1* | 6/2016 | Cattone | G07C 5/008 |
| | | | | 701/31.5 |
| 2016/0344704 | A1* | 11/2016 | Stumpf | H04L 63/10 |
| 2016/0364224 | A1* | 12/2016 | Tuukkanen | G06F 8/656 |
| 2016/0371481 | A1* | 12/2016 | Miyake | H04L 63/0846 |
| 2017/0022015 | A1* | 1/2017 | Gollu | G06Q 10/087 |
| 2017/0053169 | A1* | 2/2017 | Cuban | B64C 39/024 |
| 2017/0190260 | A1* | 7/2017 | Wang | B60L 53/126 |
| 2017/0263134 | A1* | 9/2017 | Blomberg | G08G 5/0082 |
| 2017/0267256 | A1* | 9/2017 | Minster | B60W 50/082 |
| 2017/0278312 | A1* | 9/2017 | Minster | G06Q 10/00 |
| 2017/0293894 | A1* | 10/2017 | Taliwal | G06K 9/00671 |
| 2017/0344958 | A1* | 11/2017 | Lumera | G06Q 10/20 |
| 2017/0364869 | A1* | 12/2017 | Tarte | G06Q 10/1095 |
| 2017/0371328 | A1* | 12/2017 | Waddington | G05B 23/0218 |
| 2018/0012198 | A1* | 1/2018 | Ricci | G06K 19/0708 |
| 2018/0109767 | A1* | 4/2018 | Li | H04N 7/188 |

OTHER PUBLICATIONS

Office Action for U.S. Appl. No. 15/190,022, dated Nov. 2, 2018, Hanlon et al, "Unmanned Aerial Vehicle Maintenance Troubleshooting Decision Tree", 31 pages.

Office Action for U.S. Appl. No. 15/190,022, dated Dec. 7, 2017, Hanlon et al, "Unmanned Aerial Vehicle Maintenance Troubleshooting Decision Tree", 25 pages.

Office Action for U.S. Appl. No. 15/190,022, dated Jun. 1, 2018, Hanlon et al, "Unmanned Aerial Vehicle Maintenance Troubleshooting Decision Tree", 29 pages.

* cited by examiner

US 11,597,535 B1

UNMANNED AERIAL VEHICLE MAINTENANCE TROUBLESHOOTING DECISION TREE

CROSS-REFERENCE TO RELATED APPLICATIONS

This application is a continuation of, and claims priority to, co-pending, commonly-owned U.S. patent application Ser. No. 15/190,022 filed on Jun. 22, 2016, which is incorporated herein in its entirety by reference.

BACKGROUND

Like all vehicles, aircraft need occasional repair and maintenance to perform as intended by an operator. In some instances, an aircraft may experience a fault during operation. For example, a sensor may determine that a parameter is out of a standard operating range, and in response, may trigger a notification to a controller of the aircraft. The controller may then take action, based on the notification, such as to expedite landing, or to take other action. In some instances, the aircraft may require maintenance before initiating another flight. Any downtime the aircraft has due to maintenance being performed on the aircraft can be expensive and disruptive to an entity that deploys the aircraft.

Unmanned aerial vehicles (UAVs), unlike some conventional aircraft, may include many variations of software that operate the UAVs. For example, some UAVs may include the same hardware, but may operate different software for various reasons, such as to cause the UAVs to perform different tasks, operate in different environments or geographical locations, and/or for other reasons. In addition, hardware may vary widely across similar UAVs based on availability of hardware components and/or specific operating needs of the UAVs. For example, some UAVs may be equipped with different transceivers than others to enable different types of communications and/or operate in different environments. These variations in software and hardware present specific challenges in isolating maintenance problems and finding solutions to those problems.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
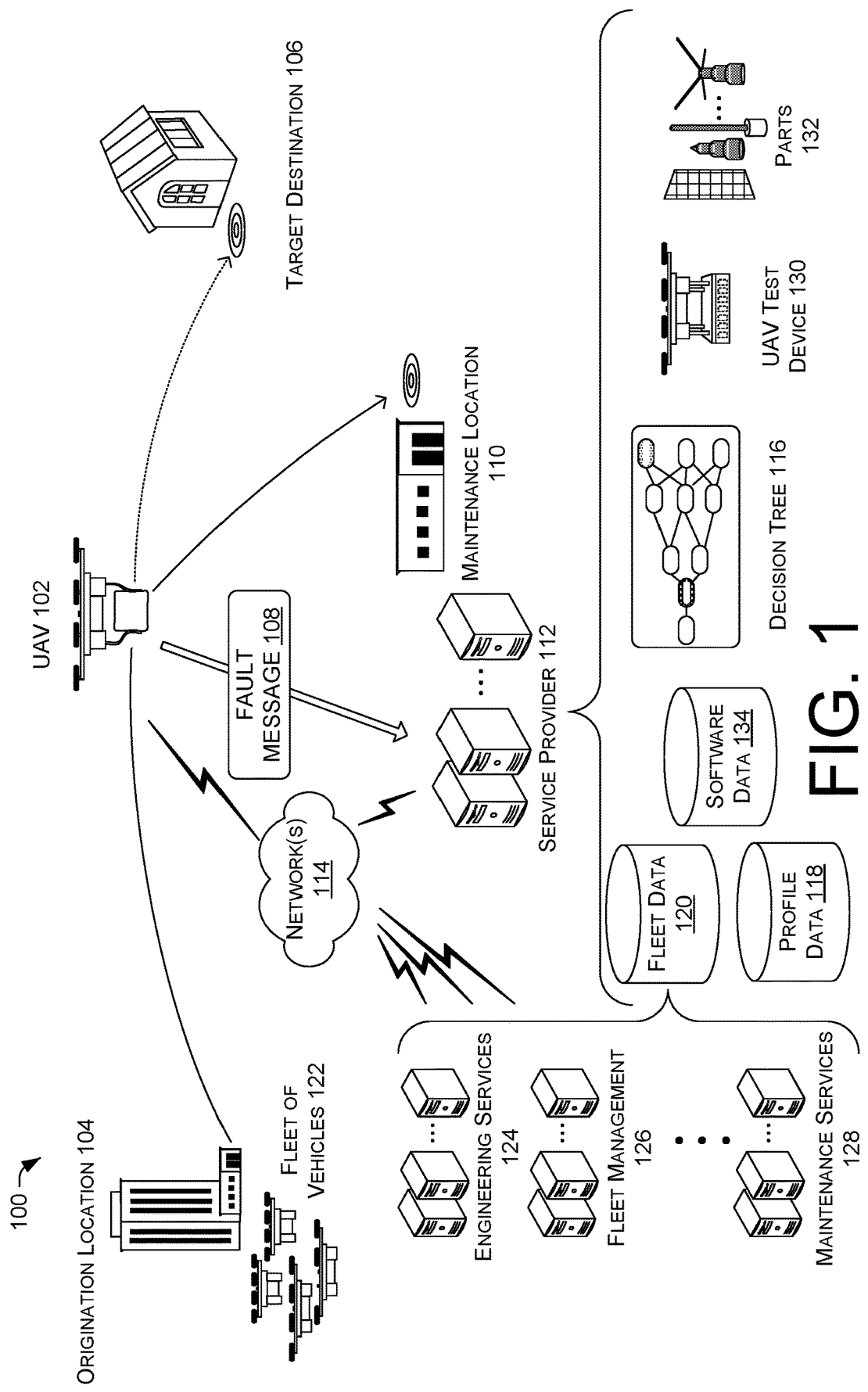
FIG. 1 is a schematic diagram of an illustrative environment useable to perform UAV maintenance troubleshooting.

This disclosure is directed to performing automated or partially automated maintenance troubleshooting using a decision tree to perform expedited maintenance on an unmanned aerial vehicle (UAV), thereby reducing downtime of the UAV. In some embodiments, a UAV may experience a malfunction or other occurrence that initiates a maintenance notification to be sent to a service provider. The maintenance notification may be a fault message or other indication, which may be triggered by an operational parameter being outside of a normal operational range or triggered from other information. The notification may be sent by the UAV, by a central command, or by another entity that monitors operational data of the UAV. The service provider may identify the UAV, such as to access a profile associated with the UAV that includes at least hardware and software configurations for the UAV. The profile may be an identifier that is linked to other data about the UAV. The service provider may receive information associated with the maintenance notification, such as operational data associated with the notification, operational data that triggered the notification, log data associated with the notification, software running during a fault associated with the notification, and/or other relevant data.

The service provider may generate a customized maintenance troubleshooting decision tree to organize tasks to be performed for the specific UAV to determine a maintenance action to remedy a fault or problem that caused maintenance notification. Thus, the decision tree may be formed using history of the UAV (e.g., operational data, deployment data, etc.), engineering data, maintenance data, software version data, hardware version data, UAV fleet data, and/or other data to construct the decision tree tailored to the specific UAV under analysis. In some embodiments, some operations included in the decision tree may be performed in an automated process, such as by running an automated test protocol to analyze performance of software and/or hardware used by the UAV. In various embodiments, at least some steps included in the decision tree may require human interaction, such as inspection by a person, moving the UAV to/from a UAV test device, installing a part, and/or other human operations. In such situations, the decision tree may receive feedback via user interaction to enable traversal of the decision tree via such input. In various embodiments, the decision tree may lead to updates of hardware, updates to software, and/or further analysis via the UAV test device, which may measure physical interaction with the UAV during a testing protocol. Ultimately, by interacting with the decision tree, one or more maintenance action may be identified that, when implemented on the UAV, may remedy a problem associated with the maintenance notification, while reducing downtime of the UAV via the use of the decision tree.

In various embodiments, the decision tree includes a maintenance action including installation of a substitute part for the UAV in lieu of a standard part. The substitute part may include at least some attributes that are different than the standard part, which may not be readily available or otherwise not selected for use with the UAV. The decision tree may further include a software update to enable the UAV to account for at least some of the different attributes of the substitute part. For example, the software update may include an updated driver, an update to a vehicle metrics (e.g., center of mass, a performance metric, etc.), and/or other updates to enable proper use of the substitute part and/or proper control and operation of the UAV.

In some embodiments, the decision tree may query data associated with other UAVs to determine whether or not the maintenance notification is associated with a particular software version or portion of software used by a particular UAV. For instance, a fleet of UAVs may include some UAVs having similar or the same hardware configurations, but running different software versions or utilizing different software patches. The variation in software may be based on many different factors, such as the tasks performed by the UAVs, rollout schedules of new software, and/or other reasons. These differences may enable isolating or exempting software as a cause of a problem associated with a maintenance notification.

When the service provider determines to update software of the UAV, such as in response to an outcome obtained via traversal of the decision tree, the update may be selected from various options. For instance, the decision tree may determine whether to update a software version to a new version, install a software patch, revert to a prior version of software, and/or perform other actions to update software, such as by initiating a ticket for further inspection of the software, such as by a software developer or specialist.

The techniques and systems described herein may be implemented in a number of ways. Example implementations are provided below with reference to the following figures.

FIG. 1 is a schematic diagram of an illustrative environment 100 useable to perform UAV maintenance troubleshooting. A UAV 102 may be deployed to deliver a package from an origination location 104 to a target destination 106, such as a residence of a customer. The origination location 104 may be a fulfillment center or other location where the package awaits delivery. During operation of the UAV 102, the UAV may transmit a fault message 108 (also referred to herein as a "maintenance notification"), which may indicate an occurrence of an event, identified via data analysis, that may require maintenance of the UAV to remedy a problem with the UAV. For example, the UAV 102 may generate data that indicates abnormal operation of the UAV 102 or one or more components of the UAV 102, such as a power supply, a propulsion unit, a control unit, and/or a communication link. In some embodiments, the fault message 18 may require diverting a course of the UAV 102 from the target destination 106 to a maintenance location 110. However, depending on the type of fault message 108, the UAV may continue operation to the target destination 106 prior to traveling to the maintenance location 110. In various instances, the UAV 102 may be delivered to the maintenance location by means other than under self-supported flight by the UAV 102, such as when the UAV 102 is unable to fly to the maintenance location 110.

In accordance with one or more embodiments, a service provider 112 may receive the fault message 108 from the UAV 102, via one or more networks 114, either directly or through an intermediary. In some embodiments, in response to receiving the fault message 108, the service provider 112 may direct the UAV 102 to the maintenance location 110, which may be selected based on a location of the UAV, the fault message 108, resources at the maintenance location 110, and/or other information available to the service provider 102. The service provider 102 may collect information from the UAV 102 and/or about the UAV 102 to create a customized troubleshooting decision tree 116 to expedite maintenance of the UAV 102, and thereby reduce downtime of the UAV. The decision tree 116 may be implemented by the service provider 102 with little or no human interaction. However, some portions of the decision tree 116 may specify tasks directed at some human activity, such as moving the UAV 102, replacing a part on the UAV 102, and/or performing other tasks.

In some embodiments, the service provider 112 may obtain data about the UAV 102, including information from profile data 118 associated with the UAV 102. The profile data 118 may indicate hardware and software used by the UAV 102, among other possible information specific to the UAV 102. The service provider 112 may query fleet data 120 for additional information about the UAV 102 and other UAVs 122 that have similar hardware and/or software to gather information to create the troubleshooting decision tree 116 to perform maintenance on the UAV 102. For example, the queries may identify other UAVs of the UAVs 122 that have experienced similar problems and determine solutions used to correct those problems. The fleet data 120 may be populated, at least in part, via the networks 114, by data from various sources, such as engineering services 124, fleet management 126, maintenance services 128, and/or other sources that collect or maintain data pertaining to the UAVs.

The service provider 112 may include tasks and/or operations in the decision tree 116, which are to be performed in association with the UAV 102. At least some of the tasks and/or operations may include testing the UAV 102 using a UAV test device 130. The UAV test device 130 may be used to measure physical interaction with the UAV 102 during a testing protocol, such as to isolate faults caused by particular hardware or operation of hardware on the UAV 102, or possibly due to software issues (e.g., bugs, etc.) that control that hardware.

In various embodiments, the service provider 112 may include operations in the decision tree 116 to replace one or more parts 132 of the UAV, possibly using substitute parts which may be used in lieu of standard parts when the standard parts or not readily available or otherwise not selected (e.g., based on cost, reliability, etc.). However, standard parts may be used when available at the maintenance location 110. As an example, the UAV 102 may include electric motors of a first type (e.g., model xyz123). However, that electric motor may not be available at the maintenance location, but a substitute part (e.g., model abc124) may be available and may be installed on the UAV 102, possibly along with a software update to enable proper functionality of the UAV 102 configured with the substitute part or proper functionality of the substitute part (e.g., updating a driver that controls the substitute part, etc.).

In some embodiments, the service provider 112 may update software of the UAV 102 as a maintenance action (or part of a maintenance action) using software data 134. The software data 134 may include different versions of software capable of causing the UAV 102 (or other ones of the UAVs 122) to perform specific tasks and/or operations. In some instances, different software may be run or installed on UAVs that are the same or very similar. Some of the versions may be newer versions, which may be rolled out in stages to prevent possible interruption of operation of the fleet of UAVs 122 caused by an undetected software glitch (e.g., bug) or other problem, such as when testing different versions of software. The software data 134 may include patches to fix specific problems with software, enable use of specific parts, and/or otherwise update the software without updating a full version of the software. The patches may include updates to drivers which control some parts or components of the UAV. The service provider 112 may use the software data 134 to update the software used by the UAV 102 in response to a maintenance action determined via the decision tree 116.

By creating the decision tree 116 that is tailored to the specific UAV 102, and by extracting information about that UAV, the fleet of other UAVS 122, fleet data 120, profile data 118, and various test information, which is used during traversal of the decision tree 116, the service provider 112 may expedite maintenance of the UAV 102 to reduce downtime of the UAV 102.

Figure 2:
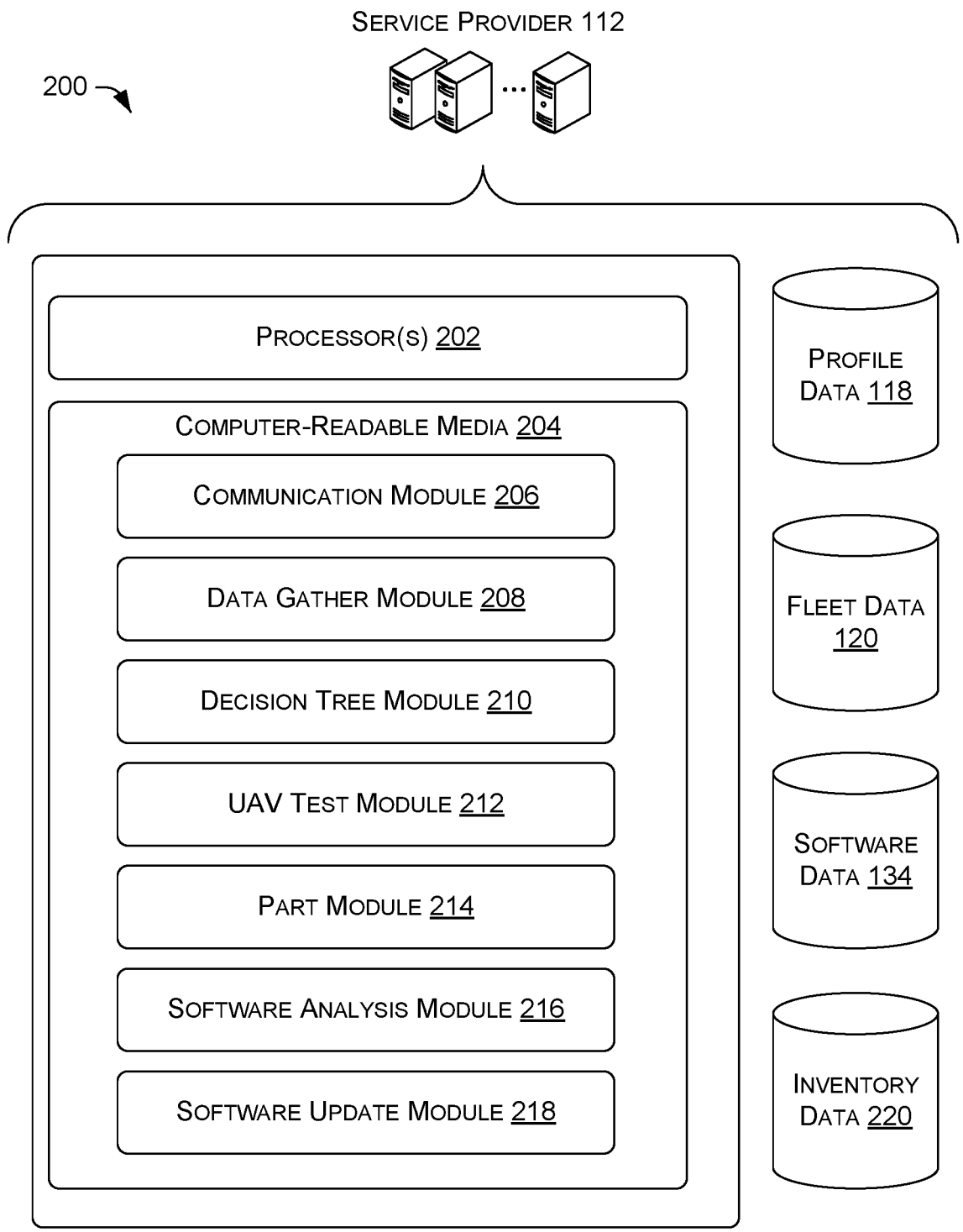
FIG. 2 is a block diagram of an illustrative computer architecture of the service provider shown in FIG. 1.

FIG. 2 is a block diagram of an illustrative computer architecture 200 of the service provider shown in FIG. 1. The computing architecture 200 may be implemented in a distributed or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the service provider 112.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by a network download.

In some embodiments, the computer-readable media 204 may store a communications module 206, a data gathering module 208, a decision tree module 210, a UAV test module 212, a part module 214, a software analysis module 216, and a software update module 218, which are described in turn. The components may be stored together or in a distributed arrangement.

The communications module 206 may receive maintenance notifications, such as fault messages, from UAVs, possibly relayed from intermediary sources. For example, some communications may be routed to a central location, and then distributed to a maintenance location for implementation where the maintenance location is the expected or assigned location where maintenance of the UAV will occur. The communications module 206 may also facilitate communications with other data sources, such as the engineering sources, 124, the fleet management 126, the maintenance services 128, and/or other services to collect data to be used to create the decision tree 116 and/or to determine maintenance operations or tasks for a UAV associated with a maintenance notification.

The data gathering module 208 may obtain data from the various data sources, such as the profile data 118, the fleet data 120, and/or the software data 134. In some embodiments, the data gathering module 208 may populate the fleet data 120 via data received via the communications module 206. In some embodiments, the data gathering module 208 may perform at least some analytics on the data, such as to determine relationships between vehicles, software versions, hardware, and/or other data in the fleet data 120 and/or the profile data 118. The data gathering module 208 may also link data between the profile data 118 and the fleet data 120, to enable access to a thorough operational history of a UAV, such as the UAV 102, via the profile of the UAV, such as when the operational data is stored in the fleet data 120.

The decision tree module 210 may create the custom decision tree 116. The decision tree module 120 may create a custom decision tree for each fault message received from a specific UAV. The decision tree module 210 may access the profile of the UAV that is associated with the maintenance notification. The decision tree module 210 may then compile data from the profile data 118 and/or the fleet data 120 to identify data to use in constructing the decision tree. In some embodiments, the general framework of the decision tree may be predetermined based on the fault message, but modified based on the data in the profile data 118 and/or the fleet data 120. For example, specific relationships between the UAV and the fleet of vehicles 122 may cause a modification of the decision tree, such as when the UAV includes an atypical configuration of hardware and/or software that does not perfectly align with another UAV that has reported the same fault message, and that was later resolved via maintenance.

The decision tree module 210 may organize the decision tree to expedite maintenance of the UAV, while taking into account resources available at the maintenance location 110 used to maintain the UAV. For example, some testing apparatuses and/or some parts may not be available at certain locations. The organization of the decision tree may be based on various factors, such as weights applied to particular data sources which indicate reliability of that data, statistical likelihood of an action isolating a cause of the fault message, time to compete a task in the decision tree, and so forth.

The UAV test module 212 may be used to perform specific tests on the UAV related to operation and performance of the hardware while the UAV is secured or located in the UAV test device 130. For example, the UAV test module 212 may measure physical interaction with the UAV 102 by implementing a testing protocol, such as to isolate faults caused by particular hardware or operation of hardware on the UAV 102, or possibly due to software issues that control that hardware. The test protocol may be an operation or task included in the decision tree. For example if the fault message relates to a control issue, then the UAV test module 212 may test operation of control mechanisms, propulsion units, and/or other hardware used to control the UAV to determine if the hardware operates as intended.

The part module 214 may determine parts available for use to maintain or repair the UAV, possibly by accessing inventory data 220 that includes information about parts available at different maintenance locations. The part module 214 may include mappings to substitute parts that can be used in place of standard parts when the standard parts are not readily available or desirable. The part module 214 may determine additional information, such as software updates to be performed when a substitute part is used in place of a standard part.

The software analysis module 216 may cause an automated UAV software test device to analyze software of the UAV 102 to be maintained or repaired, as well as other UAVs to determine if software needs to be updated, such as by installing a different version of software and/or installing a patch or other change to existing software used by the UAV 102. In various embodiments, the software analysis module 216 may determine correlations between different fault messages and the software associated with vehicles reporting those fault messages, possibly to identify software that may be a cause or partial cause of such faults. The software analysis module 216 may communicate with the UAV 102 under maintenance, via the automated UAV software test device, by wireless or wired communications, possibly via the communication module 206 and/or the UAV test device 130. For example, the software analysis module 216 may interact with the software loaded on the UAV 102 to determine whether that software is operating properly in response to particular request initiated by the software analysis module 216. The automated UAV software test device may be a same device as the service provider 112 or a component in communication thereto.

The software update module 218 may update software on the UAV 102 as a maintenance action or as part of a maintenance action. The software update may be installation of a new or different version of software, installation of a software patch, performance of a calibration that updates software, updates to log data, and/or a change to parameters used by the software of the UAV, such as parameter of a center of mass or other metric or parameter used by the UAV. In some embodiments, the software analysis module 216 may enable a software specialist to troubleshoot code, and ultimately update the code for a specific UAV via the software analysis module 216.

Additional discussion of operations of the various modules is included below in the description of various processes performed, at least partly, by the modules.

FIGS. 3 and 5-8 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
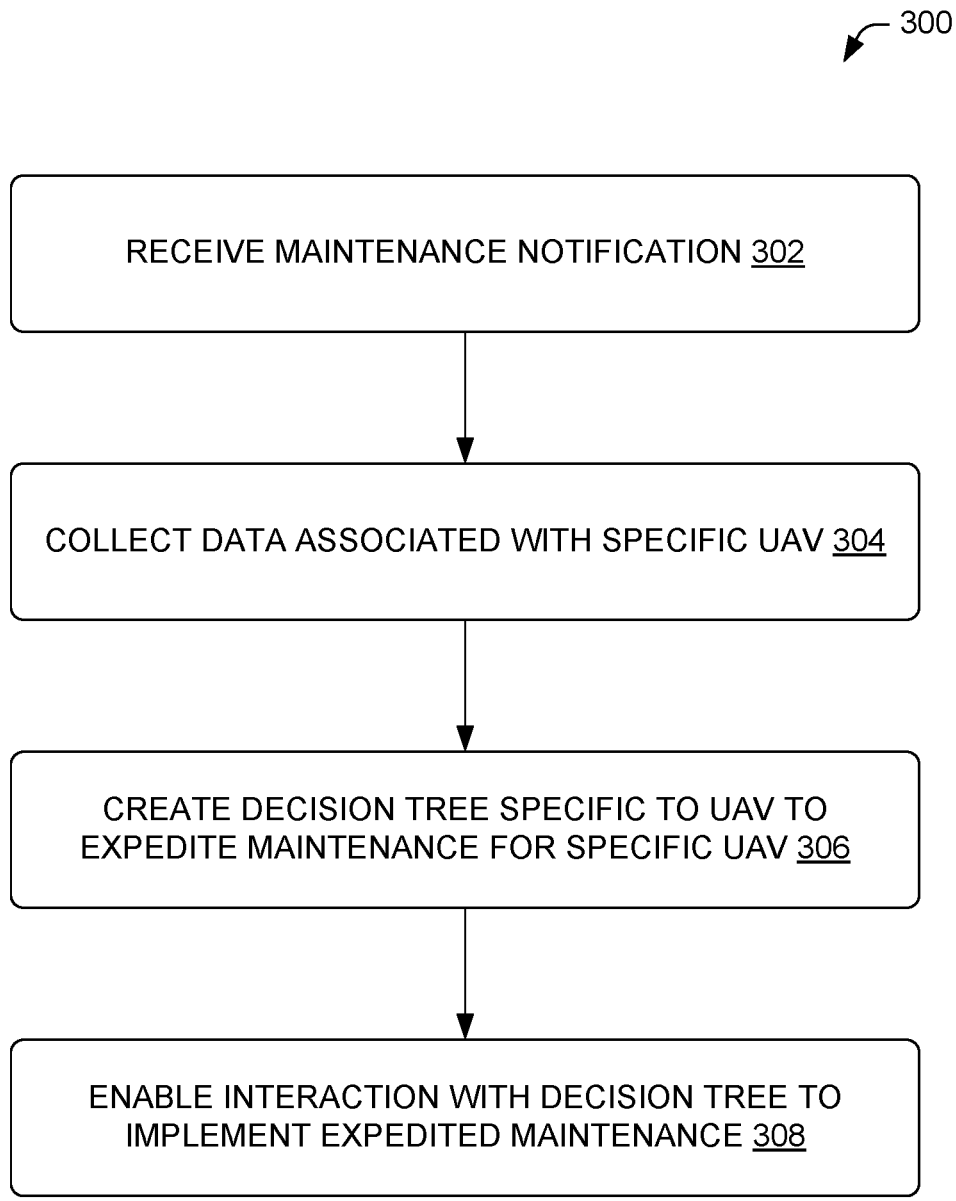
FIG. 3 is a flow diagram of an illustrative process to generate a maintenance decision tree for a specific UAV to troubleshoot a maintenance notification.

FIG. 3 is a flow diagram of an illustrative process 300 to generate a maintenance decision tree for a specific UAV to troubleshoot a maintenance notification. The process 300 is described with reference to the environment 100 and the computer architecture 200.

At 302, the communication module 302 may receive a maintenance notification. The maintenance notification may be a fault message transmitted from a UAV, such as the UAV 102, or from another entity or source on behalf of the UAV. The maintenance notification may be directly received by the service provider 112 or possibly relayed to the service provider 112 from an intermediary entity or source. The maintenance notification may include an identifier of the UAV and at least some data pertaining to the fault, such as an error code, data or software associated with triggering of the maintenance notification, log data (e.g., flight log, operational log, software execution log, etc.) and/or other data (e.g., relevant operational data, etc.).

At 304, the data gathering module 208 may collect data associated with the UAV having the maintenance notification. The data may be from the profile data 118, the fleet data 120, and/or other sources that provide data used to create a decision tree to implement efficient maintenance of the UAV to remedy the maintenance notification. For example, the data gathering module 208 may generate a query that searches for similarly equipped or configured UAVs having similar hardware and/or software configurations, which have had a similar fault and have a resolution to the fault. In some situations, the solutions may or may not be relevant to the UAV that reported the maintenance notification, which is why further testing via use of a decision tree may be implemented to remedy the fault.

At 306, the decision tree module 210 may create a decision tree customized for the UAV having the maintenance notification. The custom decision tree may enable expedited maintenance on the UAV to reduce downtime of the UAV. The decision tree module 210 may create the custom decision tree based on resources available at an assigned maintenance location, the UAV profile, information from the fleet of UAVs, and/or other available data. The decision tree may enable an automated or partly automated execution of maintenance, which may involve interaction with the decision tree to provide progress updates and/or other data, such as prompts to initiate next tasks or operations specified by the decision tree. The organization of the decision tree may be based on various factors, such as weights applied to particular data sources which indicate reliability of that data, statistical likelihood of an action isolating a cause of the fault message, time to compete a task in the decision tree, available resources (e.g., time, scheduling, parts, devices, etc.) and/or other factors. The decision tree may be created specifically for a maintenance location, such the decision tree accounts for resources available at the maintenance location, as well as other data, and availability. In some embodiments, the decision tree may include at least one maintenance action that is an outlier, and this is derived from prior maintenance of a UAV having a different configuration of hardware and/or software than the UAV having the maintenance notification.

At 308, decision tree module 210 may enable interaction with the decision tree to implement the expedited maintenance. For example, the interaction may include completing tasks, updating an estimated completion time, progress data, and so forth. In some embodiments, the interaction may be via an automated testing device, such as via the UAV test module 212 and/or the software analysis module 216. However, in some instances, a human may interact with the decision tree via the decision tree module 210, such as to complete tasks, receive instructions, and/or perform other activates or tasks. A sample user interface to interact with the decision tree is described next.

Figure 4:
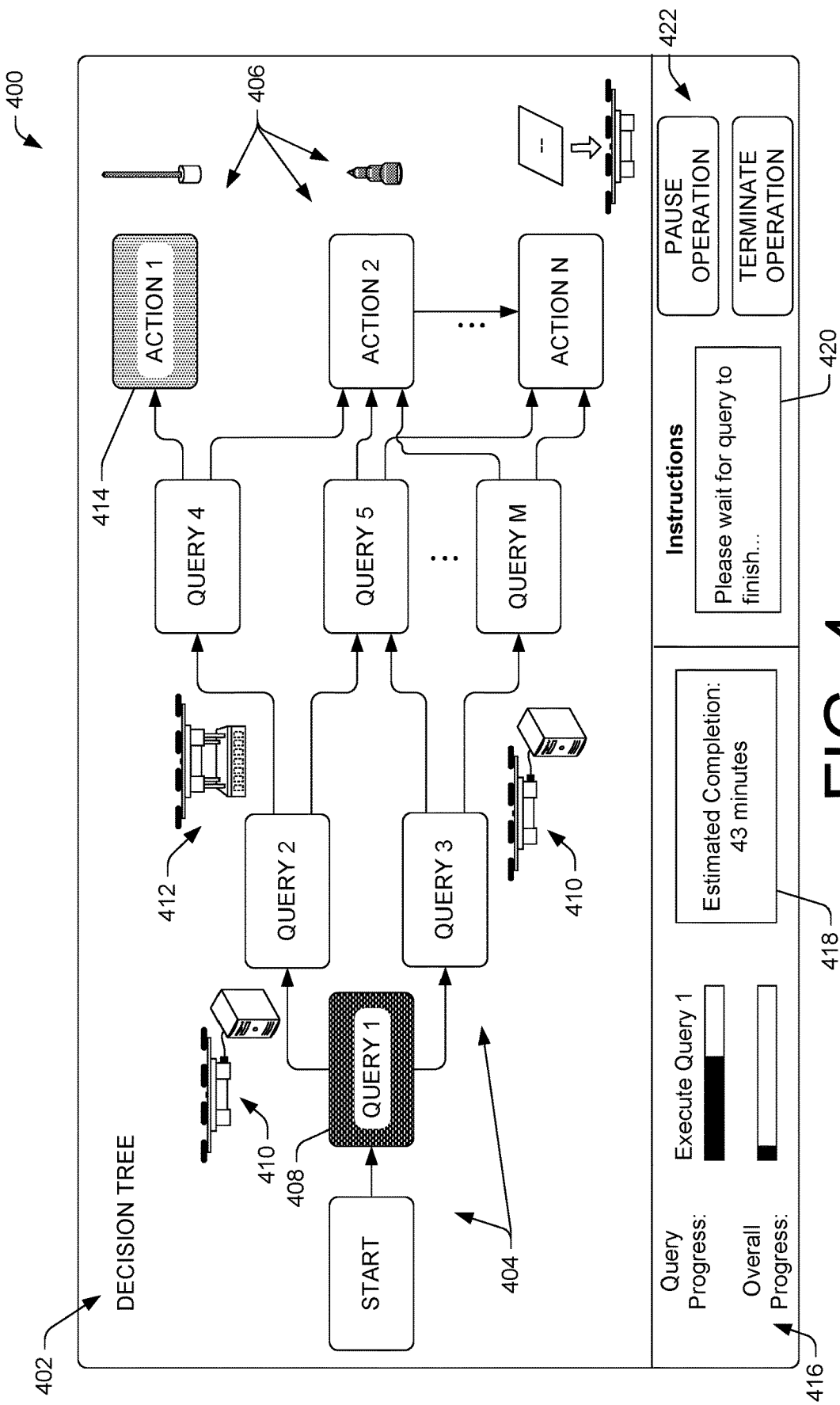
FIG. 4 is an illustrative user interface (UI) that includes a decision tree created for a specific UAV for troubleshooting a maintenance notification of the UAV.

FIG. 4 is an illustrative user interface (UI) 400 that includes a decision tree 402 created for a specific UAV for troubleshooting maintenance of the UAV. The decision tree 402 may include various operations 404, which may involve an inspection or task to be performed by an automated process and/or by a human. For example, an operation may include performing a software operational check via the software analysis module 216, which may be an automated process. In another example, the operation may be to test the UAV using the UAV test device 130, which may require a human to move the UAV to the UAV test device 130 and the UAV test module 212 to perform an automated test. After some analysis, the decision tree 402 may include maintenance actions 406, which may be determined based on traversal of the decision tree 402.

As the service provider 112, and possibly a human, interacts with the decision tree 402, the decision tree may be traversed from a starting point ultimately to an action. A current operation indicator 408 may indicate a current operation (or action) being performed. For example, as shown in FIG. 4, the current operation indicator 408 may indicate that "query 1" is currently being performed by providing a graphical display to provide the indication (e.g., shading of operation, highlight, blinking, etc.).

The decision tree 402 may include icons or other indicators of a type of operation to be performed. For example, the query 1 may be associated with a software icon 410 indicating a software or automated analysis of the UAV, which may be performed by a wireless or wired connection with the UAV. A test device icon 412 may indicate that a corresponding operation is associated with testing using the UAV test device 130. Other icons or graphics may be deployed in the decision tree 402 to visually guide a user through traversal of the decision tree.

The decision tree 402 may include at least one outlier action 414, which may be an action having a relatively low sample size relative to other actions and/or may be an action derived from a UAV having a different configuration than the UAV being maintained. The outlier action 414 may include an indicator that graphically, or otherwise indicates the action as an outlier action. In some instances, the outlier action 414 may have a lower statistical chance of being implemented via the decision tree 402.

The UI 400 may include a progress section 416, which may indicate information about progress of traversal of the decision tree 402, of queries or operations performed in the decision tree, and/or other information. In some embodiments, the UI 400 may include an estimated completion time 418. Other metrics about the status and traversal of the decision tree may be presented in the UI 400. The UI 400 may include instructions 420 to assist a user in interacting with the decision tree 402. The UI 400 may include controls 422 to cause interaction with the decision tree 402, such as to terminate an action, pause an action, or otherwise interact with the decision tree and/or maintenance of the UAV.

Figure 5:
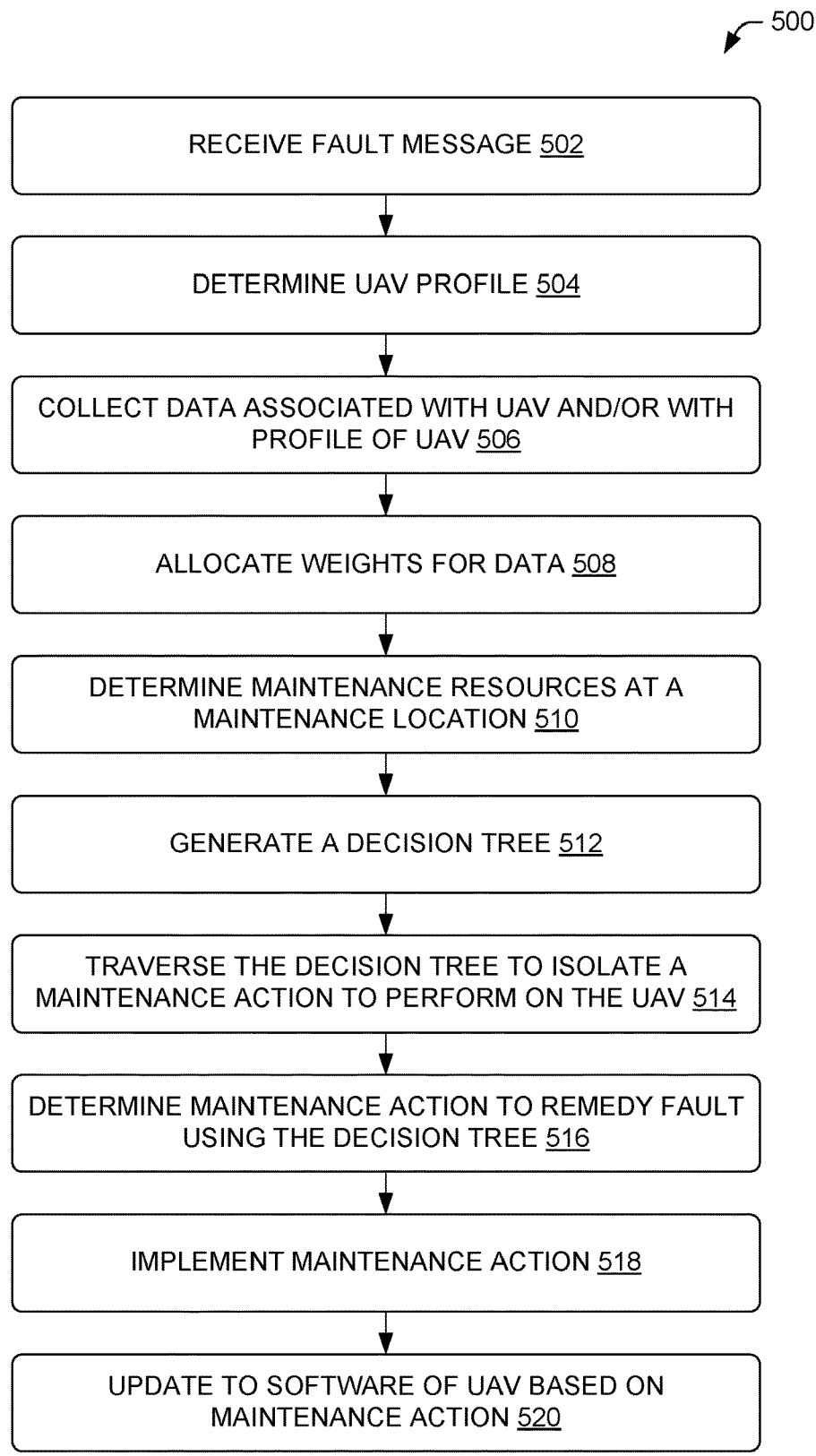
FIG. 5 is a flow diagram of an illustrative process to create and interact with a decision tree to troubleshoot and resolve a fault message from a UAV.

FIG. 5 is a flow diagram of an illustrative process 500 to create and interact with a decision tree to troubleshoot and resolve a maintenance notification from a UAV. The process 500 is described with reference to the environment 100 and the computer architecture 200.

At 502, the communication module 206 may receive a fault message 502. The service provider 112 may receive the fault message directly or indirectly from the UAV. The fault message may identify the UAV, a location of the UAV, and/or information associated with the fault, such as a code, data indicating an error or anomaly, or other data.

At 504, the data gather module 208 may determine a profile associated with the UAV stored in the profile data 118. The profile may include hardware and/or software configurations of the UAV and possibly other data about the UAV. The profile data 118 may enable linking to or accessing other data, such as operational history of the UAV included in the fleet data 120.

At 506, the data gather module 208 may collect data associated with the UAV and/or with the profile of the UAV. The data may be from the fleet data 120, and include maintenance history of the UAV, engineering data, fleet management data (e.g., operational data, etc.), and/or other data about the UAV and/or relevant data. The data may also include data about related UAV which may be helpful in determining a course of action to resolve the fault message. For example, data indicating prior occurrences of the fault message and remedies to the fault may be queried and collected by the data gather module 208.

At 508, the data gather module 208 may allocate or assign weights for use with the data collected by the data gather module. The weights may be used to prioritize or emphasize a reliability of certain data over other data. For example, engineering data may be designated as highly reliable and given a relatively high weight whereas flight history data may be less reliable and may be given a relatively lower weight. The weights may be used to create and organize the decision tree.

At 510, the service provider 112 may determine maintenance resources at a maintenance location. The resources may include parts (e.g., standard parts, substitute parts, etc.), UAV test devices, space, people, time, and/or other resources.

At 512, the decision tree module 210 may create a decision tree based on the data obtained at the operations 502 to 510. The decision tree may be customized for the UAV providing the fault message. The decision tree may enable expedited maintenance on the UAV to reduce downtime of the UAV. The decision tree module 210 may create the decision tree based on resources available at an assigned maintenance location, the UAV profile, information from the fleet of UAVs, and/or other available data. The decision tree may enable an automated or partly automated execution of maintenance, which may involve interaction with the decision tree to provide progress updates and/or other data, such as prompts to initiate next tasks or operations specified by the decision tree. The organization of the decision tree may be based on various factors, such as weights applied to particular data sources which indicate reliability of that data, statistical likelihood of an action isolating a cause of the fault message, time to compete a task in the decision tree, available resources and scheduling (e.g., time constraints, etc.) and/or other factors. The decision tree may be created specifically for a maintenance location, such the decision tree accounts for resources available at the maintenance location, as well as other data.

At 514, the decision tree module 210 may traverse the decision tree by performing operations in the decision tree and routing to next operations as specified in the decision tree. In some embodiments, the interaction may be performed, in part, via an automated testing device, such as via the UAV test module 212 and/or the software analysis module 216. However, in some instances, a human may interact with the decision tree via the decision tree module 210. Tasks or operations may be completed by an automated signal and/or by human input or interaction with a user interface (e.g., the UI 400, etc.). The traversal may be indicated on a user interface, such as the UI 400, which may include instruction, progress tracking, and/or other information.

At 516, the decision tree module 210 may determine one or more maintenance action to remedy the fault associated with the fault message, via traversal of the decision tree. In some embodiments, multiple maintenance actions may be specified or may occur before resolving the fault. In various embodiments, the decision tree may specify testing to ensure that an action has remedied the fault.

At 518, the maintenance action may be implemented. In some embodiments, the maintenance action may be a software update that may be implemented by the software update module 218, such as by installing a new or different software version, a patch, a calibration, and/or other updated metrics, parameters, or data (e.g., drivers, data sources, protocols, etc.). In some instances, the decision tree may output instructions to instruct a human worker to perform a maintenance action on the UAV, such as replace a part. As discussed above, multiple maintenance actions may be performed at the operation 518, possibly with intermediate testing or operations being performed between the maintenance actions.

At 520, the software update module 218 may update software of the UAV based on the maintenance action when the maintenance action includes replacing a part or other action that impacts operation of the software. For example, the software update module 218 may update a driver, protocol, or other software to enable the UAV to function properly with a new part or to calibrate the new part or UAV with the new part. In some embodiments, the software update module 218 may update software regardless of the maintenance action performed at the operation 518, such as to update a version of software running on the UAV to a new version.

Figure 6:
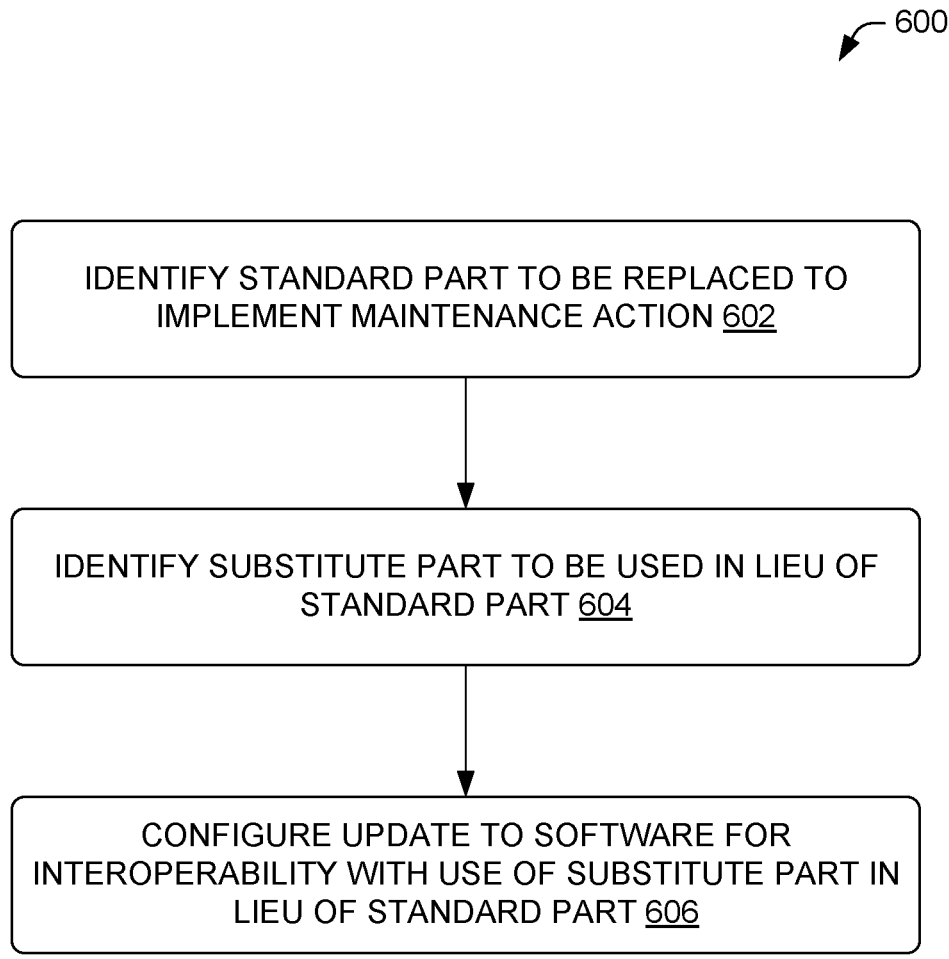
FIG. 6 is a flow diagram of an illustrative process to update software of a UAV to enable use of a substitute part by the UAV in lieu of a standard part.

FIG. 6 is a flow diagram of an illustrative process 600 to update software of a UAV to enable use of a substitute part installed in the UAV in lieu of a standard part. The process 600 is described with reference to the environment 100 and the computer architecture 200.

At 602, the part module 214 may identify a standard part to be replaced to implement a maintenance action on the UAV, as determined via the decision tree. For example, the maintenance action determined at the operation 518 in the process 500 may include replacing an electric motor on the UAV that drives a rotor to propel the UAV.

At 604, the part module 214 may identify a substitute part to be used in lieu of the standard part. The part module 214 may select the substitute part based on part availability at the maintenance location, based on time to acquire parts, and/or based on performance of the parts (e.g., lifespan, cost, efficiency, etc.), and/or based on other factors. The substitute part may be similar, but not identical to the standard part. For example, the substitute part may include different metrics, outputs, performance, size, weight, and/or other metrics, but may be determined to be compatible with use with the UAV to be maintained, such as by prior analysis or by prior use of such part by a similar UAV. In some embodiments, the substitute part may require some modification prior to use or installation, which may be specified by the part module 214. As an example, a substitute battery may be selected for use by the UAV because the substitute battery holds a charge longer, is lighter in weight, and/or is otherwise preferable over the standard battery (e.g., issued battery or prior installed battery) of the UAV.

At 606, the part module 214 may configure an update to software to provide interoperability with use of the substitute part in lieu of the standard part. For example, the part module 214 may cause the software update module 218 to update a driver, provide a software patch, update metrics (e.g., a center of mass, performance metrics, etc.), perform a calibration, and/or perform other actions based on the differences between the substitute part and the standard part.

Figure 7:
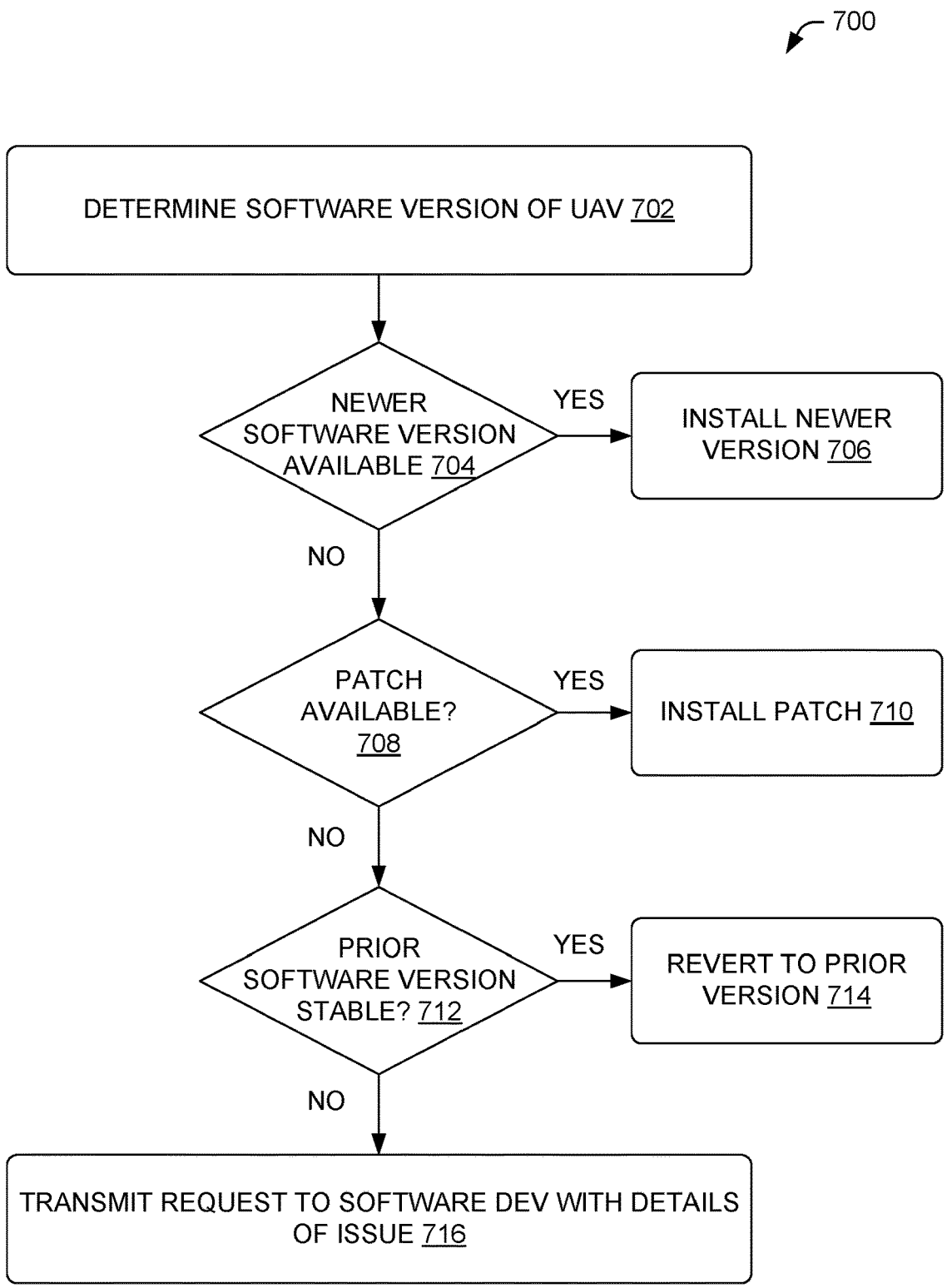
FIG. 7 is a flow diagram of an illustrative process to update software of a UAV in response to a maintenance notification.

FIG. 7 is a flow diagram of an illustrative process 700 to update software of a UAV in response to a maintenance notification. The process 700 is described with reference to the environment 100 and the computer architecture 200.

At 702, the software update module 218 may determine a software version of the UAV to be maintained. In some embodiments, the UAV may include multiple different software applications, such as an operating system, one or more control applications, one or more communication applications, and so forth. However, some UAVs may include a core software version that includes software to perform the various functions and/or operations required by the UAV. For discussion purposes, both configurations may be solved using the process 700. In the former version of multiple software instances, the process 700 may update one or more of those software instances.

At 704, the software update module 218 may determine whether a new version of the software is available for use by the UAV, which may improve performance of the UAV (e.g., remedy the fault message and/or provide other improvements in performance, reduce cost, etc.). In some embodiments, new versions of software may be rolled out per a schedule to phase in the new version, such as to implement software version testing or a controlled or staggered release. The software update module 218 may abide by such a rollout schedule via the decision operation 704. When a new version of the software is available (following the "yes" route from the decision operation 704), then the process 700 may advance to an operation 706. At 706, the software update module 218 may install the new version of the software on the UAV.

When a new version of the software is not available (following the "no" route from the decision operation 704), then the process 700 may advance to a decision operation 708. At 708, the software update module 218 may determine whether a software patch is available to update software for use by the UAV, which may improve performance of the UAV (e.g., remedy the fault message and/or provide other improvements in performance, reduced cost, etc.). When a software patch is available (following the "yes" route from the decision operation 708), then the process 700 may advance to an operation 710. At 710, the software update module 218 may install the software patch on the UAV.

When a software patch is not available (following the "no" route from the decision operation 708), then the process 700 may advance to a decision operation 712. At 712, the software update module 218 may determine whether a prior version of the software is available for use by the UAV and is stable, which may improve performance of the UAV (e.g., remedy the fault message and/or provide other improvements in performance, reduced cost, etc.). When the prior version is available for use and improves operation of the UAV (following the "yes" route from the decision operation 712), then the process 700 may advance to an operation 714. At 714, the software update module 218 may install the prior version of the software on the UAV.

When the prior version is not available for use and/or does not improve operation of the UAV (following the "no" route from the decision operation 712), then the process 700 may advance to an operation 716. At 716, the software update module 218 may transmit a request to a software developer or specialist with details of a software problem or bug that is to be resolved to remedy a fault message or for other reasons. The details may include characteristics of the fault, software code identified as problematic, and/or other information.

Figure 8:
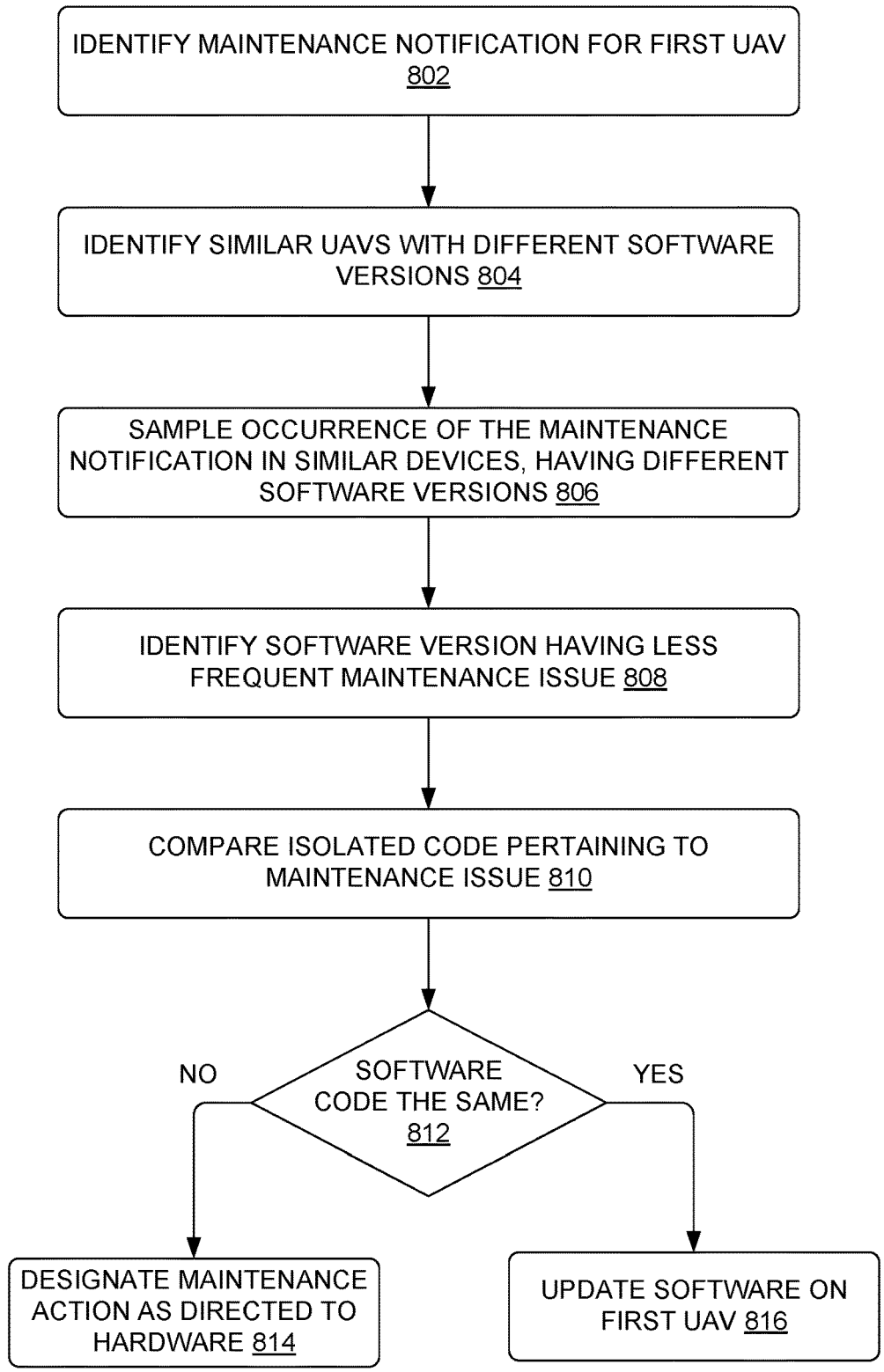
FIG. 8 is a flow diagram of an illustrative process to analyze fleet data to determine if a maintenance action is directed to hardware or software, or both.

FIG. 8 is a flow diagram of an illustrative process 800 to analyze fleet data to determine if a maintenance action is directed to hardware or software, or both. The process 800 is described with reference to the environment 100 and the computer architecture 200.

At 802, the service provider 112 may determine a maintenance notification for a first UAV. The maintenance notification may be similar to the maintenance notification received at the operation 302 in the process 300.

At 804, the software analysis module 216 may identify other UAVs having different software versions, but that are associated the first UAV. For example, the other UAVs may include similar or same hardware as the first UAV. The other UAVs may be identified via the fleet data 120.

At 806, the software analysis module 216 may sample occurrence of the maintenance notification in the other UAVs. For example, the software analysis module 216 may determine if any occurrences exist that include a same notification or a similar notification, and/or may group, cluster, or otherwise identify such prior occurrences and trends or other relationships between prior occurrences and the UAVs.

At 808, the software analysis module 216 compare software code pertaining to the maintenance notification of the first UAV, such as isolated portions of code, with prior occurrences. For example, when the maintenance notification pertains to operation of a motor, then software code used to control the motor of the first UAV may be compared to software code used to control other motors of other UAVS. The comparison may determine whether particular software code may cause or be responsible for a fault associated with the maintenance notification.

At 810, the software analysis module 216 may compare the software code of the first UAV with the software code of at least on other UAV of the other UAVs to determine if the software code is the same (or essentially the same and having only nominal differences, such as being written in a different software language, etc.). When the software code is not the same (following the "no" route from the decision operation 812), then the process 800 may advance to an operation 814. At 814, the software analysis module 216 may designate the maintenance notification as directed to hardware, and initiate further inquiry, such as by one or more additional operation to be included in the decision tree created via the processes 300 and/or 500 discussed above. When the software code is the same (following the "yes" route from the decision operation 812), then the process 800 may advance to an operation 816. At 816, the software analysis module 216 may cause the software update module 218 to update software on the first UAV, possibly in accordance with the process 700 discussed above. After update of the software via the operation 816, further testing may be conducted to determine if hardware replacement is also prudent to maintain the UAV or remedy a fault.

In some embodiments, the process 800 may be used to select use of a first version of software over a second version of software. For example, rather than designating inspection as hardware at the operation 814, a slightly modified process may determine that a problem is associated with a specific version of the software, such as the first version. This may be similar to AB testing, but may isolate problems in software to assist in creation of the decision tree described herein.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
memory to store computer-executable instructions that, when executed, cause the one or more processors to perform acts comprising:
   receiving, from a vehicle, a maintenance notification associated with the vehicle, wherein the maintenance notification includes an identifier of the vehicle;
   determining a profile associated with the vehicle based at least in part on the identifier, the profile enabling access to at least one of an operational history or a maintenance history associated with the vehicle;
   determining, based at least in part on the profile, a configuration comprised of one or more vehicle components assembled to form the vehicle;
   determining, based at least in part on the configuration and the maintenance notification, one or more additional profiles associated with one or more additional vehicles, the one or more additional vehicles including a vehicle component of the one or more vehicle components and the one or more additional profiles indicating that the one or more additional vehicles are associated with the maintenance notification;
   accessing fleet data associated with the one or more additional profiles;
   determining a decision tree that prioritizes one or more maintenance operations to be performed on the vehicle, the decision tree being based at least in part on the fleet data associated with the one or more additional profiles;
   determining weights in the decision tree associated with the fleet data, the weights being assigned based at least in part on a data source associated with the fleet data, a statistical likelihood that a maintenance action isolates a cause of the maintenance notification, and an estimate of time to complete the maintenance action, the weights including a first weight associated with a first portion of the fleet data of a first type including operational history data, the weights including a second weight associated with a second portion of the fleet data of a second type different than the first type;
   determining, based in part on at least one selection enabling traversal of the decision tree, a maintenance action to resolve the maintenance notification, the at least one selection being received via user input to a user interface; and
   causing, via execution of a software update, automatic performance of the maintenance action.

2. The system of claim 1, wherein the maintenance notification includes at least one of:
   a fault message indicating that a fault has occurred;
   an operational parameter that is outside of a normal operation range;
   a first indication of operation data that triggered the maintenance notification; or
   a second indication of software code executing in association with an error.

3. The system of claim 1, wherein the computer-executable instructions further cause the one or more processors to perform acts comprising:

determining a maintenance location based at least in part on the maintenance notification, available maintenance resources, and a distance from the maintenance location to a current location of the vehicle; and directing the vehicle from the current location to the maintenance location.

4. The system of claim 1, wherein the configuration further comprises:

a software configuration; and features of the software configuration.

5. The system of claim 1, wherein the computer-executable instructions further cause the one or more processors to perform acts comprising:

accessing additional fleet data associated with a resolved maintenance notification, the additional fleet data including at least one of i) a fault message, ii) an indication of an operational parameter outside of normal operation range, iii) operational data that triggered the resolved maintenance notification, or iv) log data associated with the resolved maintenance notification that matches the maintenance notification for the vehicle; and modifying the decision tree based at least in part on the additional fleet data.

6. The system of claim 1, wherein the decision tree includes at least one outlier maintenance operation, accessible via the decision tree that is derived from prior maintenance of a different vehicle having a second configuration different than the configuration.

7. The system of claim 1, wherein the decision tree includes at least one outlier maintenance operation, accessible via the decision tree, the at least one outlier maintenance operation associated with a lower sample size or a lower statistical chance of resolving the maintenance notification relative to other maintenance operations.

8. The system of claim 1, wherein the maintenance action includes removal of a first part of the vehicle associated with the configuration and installation of a second part on the vehicle in lieu of the first part, wherein the second part is different than the first part in at least one of lifespan, size, mass, performance metrics, performance outputs, or physical attributes, and wherein the computer-executable instructions further cause the one or more processors to perform acts comprising updating a software configuration of the vehicle based at least in part on the installation of the second part.

9. A method comprising:

receiving, by at least one server and from a vehicle, a maintenance notification associated with the vehicle, wherein the maintenance notification includes an identifier of the vehicle;

determining, by the at least one server, a profile associated with the vehicle based at least in part on the identifier, the profile enabling access to at least one of an operational history or a maintenance history associated with the vehicle;

determining, by the at least one server and based at least in part on the profile, a configuration comprised of one or more vehicle components assembled to form the vehicle;

determining, by the at least one server and based at least in part on the configuration and the maintenance notification, one or more additional profiles associated with one or more additional vehicles, the one or more additional vehicles including a vehicle component of the one or more vehicle components and the one or more additional profiles indicating that the one or more additional vehicles are associated with the maintenance notification;

accessing, by the at least one server, fleet data associated with the one or more additional profiles;

determining, by the at least one server, a decision tree that prioritizes one or more maintenance operations to be performed on the vehicle, the decision tree being based at least in part on the fleet data associated with the one or more additional profiles;

determining, by the at least one server, weights in the decision tree associated with the fleet data, the weights being assigned based at least in part on a data source associated with the fleet data, a statistical likelihood that a maintenance action isolates a cause of the maintenance notification, and an estimate of time to complete the maintenance action, the weights including a first weight associated with a first portion of the fleet data of a first type including operational history data, the weights including a second weight associated with a second portion of the fleet data of a second type different than the first type;

determining, by the at least one server and based in part on at least one selection enabling traversal of the decision tree, a maintenance action to resolve the maintenance notification, the at least one selection being received via user input to a user interface; and causing, via execution of a software update, automatic performance of the maintenance action.

10. The method as recited in claim 9, wherein the maintenance action comprises:

determining that the decision tree indicates testing to ensure the maintenance action has remedied a fault.

11. The method as recited in claim 9, further comprising:

determining that the decision tree indicates testing to ensure the maintenance action has remedied a fault; and transmitting a request including details of a software problem or bug to remedy a fault message associated with the fault.

12. The method as recited in claim 9, wherein the maintenance action comprises:

determining that hardware associated with the vehicle requires maintenance;

determining that the decision tree indicates replacement of a first part on the vehicle with a second part; and causing performance of a second software update to enable the vehicle to function with the second part.

13. The method as recited in claim 9, further comprising:

presenting a user interface (UI) that graphically indicates progress of the maintenance action in resolving the maintenance notification.

14. The method as recited in claim 9, further comprising:

executing the maintenance action;

receiving a signal from a test device indicating that the maintenance action has been completed; and selecting an additional maintenance action based at least in part on the decision tree.

15. A non-transitory computer-readable storage medium having computer executable instructions stored thereupon which, when executed by one or more processors, cause the one or more processors to perform operations comprising:

receiving, from a vehicle, a maintenance notification associated with the vehicle, wherein the maintenance notification includes an identifier of the vehicle;

determining a profile associated with the vehicle based at least in part on the identifier, the profile enabling access to at least one of an operational history or a maintenance history associated with the vehicle;

determining, based at least in part on the profile, a configuration comprised of one or more vehicle components assembled to form the vehicle;

determining, based at least in part on the configuration and the maintenance notification, one or more additional profiles associated with one or more additional vehicles, the one or more additional vehicles including a vehicle component of the one or more vehicle components and the one or more additional profiles indicating that the one or more additional vehicles are associated with the maintenance notification;

accessing fleet data associated with the one or more additional profiles;

determining a decision tree that prioritizes one or more maintenance operations to be performed on the vehicle, the decision tree being based at least in part on the fleet data associated with the one or more additional profiles;

determining weights in the decision tree associated with the fleet data, the weights being assigned based at least in part on a data source associated with the fleet data, a statistical likelihood that a maintenance action isolates a cause of the maintenance notification, and an estimate of time to complete the maintenance action, the weights including a first weight associated with a first portion of the fleet data of a first type including operational history data, the weights including a second weight associated with a second portion of the fleet data of a second type different than the first type;

determining, based in part on at least one selection enabling traversal of the decision tree, a maintenance action to resolve the maintenance notification, the at least one selection being received via user input to a user interface; and causing, via execution of a software update, automatic performance of the maintenance action.

16. The computer-readable storage medium of claim 15, wherein:

the configuration includes a hardware configuration that lists at least one of a first set of parts or a second set of parts associated with the maintenance history of the profile; and the configuration includes a software configuration that lists at least one of a software version, one or more software patches, or multiple different software applications that perform functions and operations of the vehicle.

17. The computer-readable storage medium of claim 15, the operations further comprising:

determining an availability of maintenance resources at a maintenance location, the maintenance resources including at least one of first parts associated with the configuration of the vehicle, second parts, vehicle test devices, resources, space, people, or time; and determining the maintenance action based at least in part on the availability of maintenance resources.

18. The computer-readable storage medium of claim 15, wherein the decision tree further comprises at least one outlier maintenance operation that is derived from prior maintenance of an additional vehicle having a second configuration different than the configuration of the vehicle.

19. The computer-readable storage medium of claim 15, wherein determining the maintenance action further comprises identifying at least one of an automated software test device to test software operability on the vehicle or a hardware test device to measure physical interactions of the vehicle during a testing protocol.

* * * * *